April 20, 1965     A. MORETTI     3,179,445
PIPE JOINT SPACER MEMBER
Filed April 27, 1962
FIG. 1
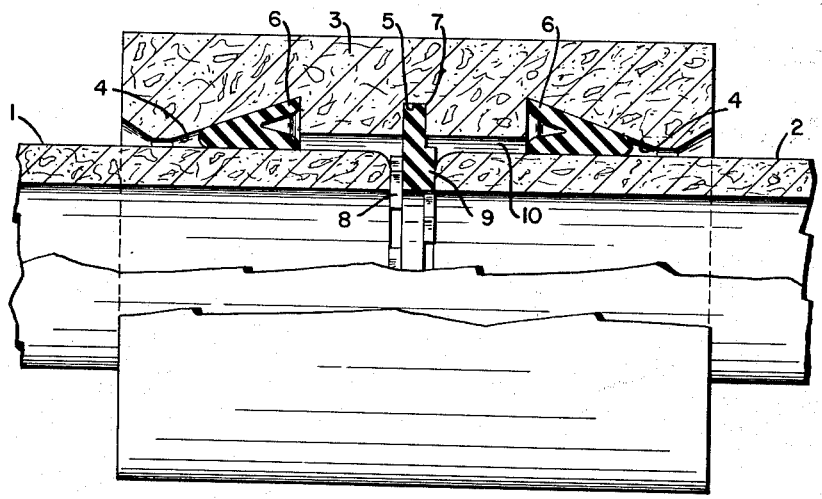
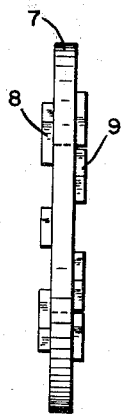
FIG. 2
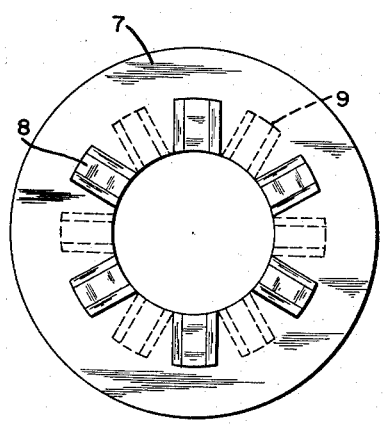
FIG. 3
INVENTOR
ALBERTO MORETTI 3,179,445
PIPE JOINT SPACER MEMBER
Alberto Moretti, Genoa, Italy, assignor to Eternit Società per Azioni, Genoa, Italy
Filed Apr. 27, 1962, Ser. No. 190,692
Claims priority, application Italy, Oct. 10, 1961, 18,575/61
1 Claim. (Cl. 285—106)

This invention relates to a pipe joint used in connection within asbestos-cement pipes and is more particularly directed to a spacer member which promotes effective hydraulic action on the sealing gaskets of the pipe joint.

Some pipe joints, as used in asbestos-cement pipe, have comprised three basic elements. They are an annular coupling member, a pair of sealing gaskets, and a resilient spacer member. The annular coupling member so used is provided with interior annular grooves with a central groove holding the spacer member and two grooves axially spaced apart from the central groove holding the sealing gaskets. The function of the sealing gaskets is to act as a seal between the annular coupling member and the pipe upon the application of hydraulic pressure by the contained fluid. The spacer member serves to hold the coupling and the opposed ends of the axially adjacent pipe sections in proper relative position while absorbing pressure exerted by the pipe ends, and thus it prevents the damaging effects of direct contact of the pipe sections against each other.

To maintain the proper sealing action of the sealing gaskets when pressure assisted gaskets, such as V-rings are used, it is important that there be free communication of fluid from the interior of the pipe sections to the interior of the coupling member and the sealing gaskets. It is also important that there be a circulation of fluid between these spaces to avoid stagnation of fluid in the interior coupling space. Stagnation can be highly deleterious particularly where the joint is used in drinking water conduits.

A pipe coupling constructed according to my invention promotes the hydraulic action of the fluid upon the sealing gaskets while at the same time avoiding the drawbacks of fluid stagnation. The coupling itself comprises generally an annular resilient spacer member having staggered axially extending projections to provide a resilient cushion between the pipe ends and to allow circulation of fluid between the staggered sections and the interior of the surrounding annular coupling member.

Referring to the drawings in which a preferred embodiment of the invention is illustrated:

FIG. 1 is a longitudinal half section through a pipe joint showing the centrally positioned sealing member;

FIG. 2 is a side view of the sealing member; and

FIG. 3 is a front view of the sealing member.

Referring to the drawings, 1 and 2 designate the axially adjacent pipe sections. The annular coupling member 3 has two axially spaced apart outer annular grooves 4 and a central inner cylindrical groove 5. Sealing gaskets 6 in the form of pressure assisted V-rings made of rubber or other resilient material are situated in the annular grooves 4. Resilient spacer member 7 is positioned in cylindrical groove 5 and between the ends of pipe sections 1 and 2. The resilient spacer member is provided with staggered axially extending projections 8 and 9. When the joint is assembled, a space 10 is provided between the annular coupling member 3 and the pipe sections 1 and 2.

In assembly, the sealing gaskets 6 are inserted into the annular grooves 4 of the annular coupling member 3 and the pipe sections 1 and 2 are introduced to the point where their ends make contact with the projections 8 and 9 of the resilient spacer member 7. Any displacement of the pipes is then absorbed by the projections 8 and 9, which, being alternately disposed on the two opposite surfaces of the spacer member 7, enables the spacer member 7 to yield to the point where the pressure exerted by the pipes is the greatest. The projections 8 and 9 may be of any shape to give them the necessary strength and requisite flexibility.

The fluid in the pipe enters through the spaces between the projections 8 and 9 into the space 10 and exerts a pressure upon the preferably V-shaped gaskets 6 so that the lips of the gasket are spread to seal against the exterior surface of the pipe sections 1 and 2 and against the interior surface of the annular grooves 4, thereby preventing leakage of the fluid.

It has been found that due to the motion of the fluid in a pipe line that a drag is created causing a slight underpressure to develop in the chamber 10. Thus, a portion of the fluid in the chamber is drawn out and fresh fluid then enters. This phenomenon is utilized in the joint of the invention to bring about fluid circulation in the space 10 thereby avoiding stagnation in the chamber.

Although the invention has been described and illustrated for the sake of convenience in terms of the embodiment outlined above, it lends itself to many modifications and adaptations. For example, to prevent the spacer member 7 from being forced out of the cylindrical groove 5 by concentration of pressure at one point, groove 5 can be constructed with a trapezoid or other cross sections so that the gasket is retained therein.

I claim:

A pipe joint for joining axially adjacent sections of frangible pipe comprising, an annular coupling member having an annular groove therein, said coupling member surrounding the opposite ends of axially adjacent pipe sections, fluid pressure operated sealing gaskets positioned on opposite sides of said groove between said pipe sections and said annular coupling member to provide a fluid-tight pipe joint, and an annular resilient spacer ring made of a pliable material having a plurality of circumferentially spaced projections on opposite faces of said ring with said projections extending radially a distance substantially equal to the wall thickness of said pipe and extending axially outwardly from each face to contact the ends of said adjacent pipe sections and the projections on one face being staggered circumferentially with the projections of the other face to provide a resilient cushion between the ends of said adjacent pipe sections and to allow circulation of fluid between the sections and the surrounding annular coupling member, and means on the outer periphery of said ring engaging said annular groove to position said ring axially in said coupling member.

References Cited by the Examiner
UNITED STATES PATENTS 2,184,376  12/39  Beyer _____ 285—374
2,871,031   1/59  Altemus _____ 285—111

FOREIGN PATENTS 535,137   11/55  Italy.
1,054,296  4/59  Germany.

CARL W. TOMLIN, *Primary Examiner.*